United States Patent [19]

Mizutani et al.

[11] 3,917,966

[45] Nov. 4, 1975

[54] VIBRATOR

[75] Inventors: Seiki Mizutani; Yasuyoshi Kaneda, both of Tokyo, Japan

[73] Assignee: Kabushiki Kaisha Hattori Tokeiten, Japan

[22] Filed: Dec. 12, 1974

[21] Appl. No.: 531,978

Related U.S. Application Data

[63] Continuation of Ser. No. 215,492, Jan. 5, 1972, abandoned, which is a continuation-in-part of Ser. No. 4,831, Jan. 22, 1970, abandoned.

[30] Foreign Application Priority Data

Jan. 23, 1969 Japan .............................. 44-5537

[52] U.S. Cl. .................. 310/25; 58/23 V; 58/23 TF

[51] Int. Cl.² ........................................ H02K 33/00

[58] Field of Search ............ 310/21, 22, 25; 58/23, 58/23 V, 23 TF; 331/116, 116 M, 156; 318/128, 132; 84/409, 957

[56] References Cited

UNITED STATES PATENTS

| | | | |
|---|---|---|---|
| 2,594,749 | 4/1952 | Ehrat et al. | 84/409 |
| 3,150,337 | 9/1964 | Allison | 331/116 X |
| 3,515,914 | 6/1970 | Steineman | 310/25 X |

*Primary Examiner*—Donovan F. Duggan
*Attorney, Agent, or Firm*—Robert E. Burns; Emmanuel J. Lobato; Bruce L. Adams

[57] ABSTRACT

A mechanical vibrator comprises a base section, four flexural vibratory arms extending outwardly from the base section, and at least one pair of supporting arms also extending outwardly from the base section. The base section and the four flexural vibratory arms are configured in an H-shape. The supporting arms are mounted upon mounting posts and cooperate with the vibrating arms to ensure vibration of the vibrator in a normal vibrating mode which does not include any vibrating component of a spurious vibrating mode.

9 Claims, 8 Drawing Figures

VIBRATOR

This is a continuation, of application Ser. No. 215,492, filed Jan. 5, 1972 now abandoned which in turn is a continuation-in-part of Ser. No. 4,831 filed Jan. 22, 1970 now abandoned.

The present invention relates generally to a vibrator and more particularly, to a mechanical vibrator used as a precision frequency source or mechanical filter for a clock.

Vibrators are known which have four vibratory arms extending from a base section and which have a mounting post welded to the center of the base section. During the manufacturing of the conventional vibrator, it is technically very difficult to precisely weld the mounting post at the exact geometric center of the vibrator and it is also difficult to weld it thereto in such a manner that the welded area is small yet capable of obtaining sufficient mechanical strength therebetween. Consequently, most conventional vibrators generally have their centroid displaced a small distance from the geometric center.

Accordingly, when the vibrator is vibrated in such a manner that each vibrating arm has a phase difference of 180 degrees with respect to an adjacent vibrating arm during vibration in a preferable mode, which is hereinafter referred to as a normal vibrating mode, it is disadvantageous in that some vibrational energy leaks from the supporting point of the vibrator thereby lowering the quality factor Q and in addition, when the vibrator receives a noise, it cannot maintain the normal vibrating mode but vibrates instead in a spurious vibrating mode.

The vibrator of the present invention eliminates the aforementioned disadvantages of the conventional vibrator.

According to one aspect of the present invention, there is provided a vibrator having a base section, four flexural vibratory arms extending symmetrically from the base section such that the base section and the four vibratory arms are configured in an H-shape, and at least one pair of supporting arms extending in a direction of one of the symmetrical axes of the vibrator. The supporting arms are positioned on opposite sides of the base section and function to keep the frequency of any spurious vibrating modes away from that of the normal vibrating mode so that the vibrator vibrates only in its normal vibrating mode without including a vibrating component of a spurious vibrating mode. The base section is coplanar with respect to the flexural vibratory arms and supporting arms and means are provided for mounting the pair of supporting arms to a stationary support.

The vibrator of the present invention differs from the conventional vibrator in that it is supported by way of supporting arms connected to mounting posts with sufficient rigidity so as to hardly affect a change of the frequency due to aging. In addition, the aforementioned supporting arms effect not only a supporting action for the vibrator during vibration in a normal vibrating mode, but they also function as vibrating arms during vibration in a spurious vibrating mode so as to vibrate the vibrator in the frequency of the spurious vibrating mode away from the frequency of the normal vibrating mode and hence effectively dampen out any spurious vibrating frequencies. This dampening action lowers the quality factor of the spurious mode of vibration whereupon the vibrator may continue to vibrate steadily only in a normal vibrating mode and also prevents the vibrating energy from leaking from the supporting portion of the vibrator with the beneficial result that an extremely high quality factor on the order of 4,000 is achieved.

One object of the present invention is to provide a vibrator which is easy to manufacture, vibrates with high accuracy, and has a high quality factor on the order of approximately 4,000.

Other objects, advantages and features of the present invention will become apparent from a reading of the following description when taken in conjunction with the accompanying drawings, in which.

FIG. *6a* is a plan view of another embodiment of a vibrator;

FIG. *6b* is a side view of the vibrator shown in FIG. *6a;* and

Figure 7:
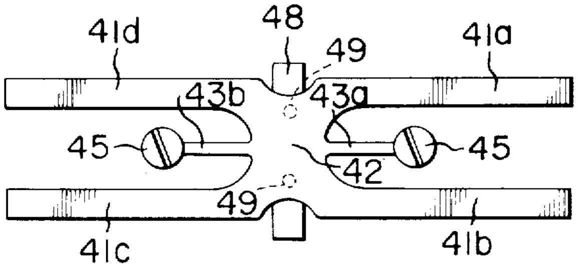

FIG. 7 is a plan view of a further embodiment of the vibrator.

Figure 1:
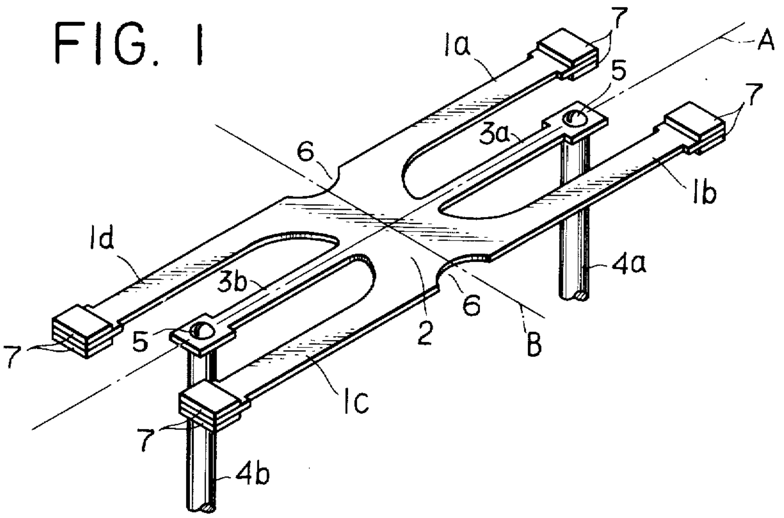
FIG. 1 is a perspective view of a vibrator in accordance with the present invention.

Referring now to FIG. 1, a vibrator of H-shape configuration constructed in accordance with the present invention is composed of resilient sheet material and comprises four resilient vibratory arms **1*a*, 1*b*, 1*c* and 1*d* each having the same vibrational frequency. The arms extend outwardly from a resilient base section 2 and are coplanar with respect to the base section 2 and define therewith a symmetrical H shape. As readily seen in the drawings, the base section 2 has a width dimension greater than that of the vibratory arms 1*a*–1*d*** and the base section is wider at its two end portions which are located adjacent the vibratory arms than at its midportion. During operation of the vibrator, vibrational energy possessed by the vibratory arms and the base section is stored as strain energy at the end of each vibrational stroke.

A pair of supporting arms **3*a* and 3*b* extend from the base section 2 between the resilient vibratory arms 1*a*, 1*b* and 1*c*, 1*d* respectively, along the longitudinal axis of symmetry A of the symmetrical resilient vibratory arms. The ends of both supporting arms 3*a* and 3*b* are secured to the upper ends of mounting posts 4*a* and 4*b* by means of screws 5**.

Figure 2:
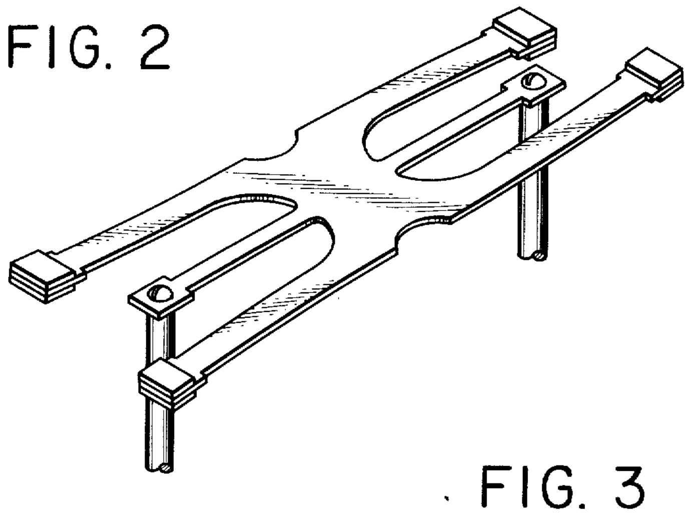
FIG. 2 is a perspective view of the vibrator in a normal vibrating mode.

The base section 2 undergoes both torsional and bending deformation during operation of the vibrator and cutouts 6 are provided at both ends of the base section 2 along the transverse axis of symmetry B to determine the extent of coupling through torsion between the respective vibratory arms **1*a* through 1*d*. The entire vibrator may be formed as an integral unit by stamping from a resilient metal plate. Masses 7 are fixedly secured to both sides of the ends of the respective resilient vibratory arms 1*a* through 1*d* and are used to balance the mass of the vibratory arms with respect to each other. FIG. 2** shows the vibrator operating in a normal vibrating mode.

Figure 3:
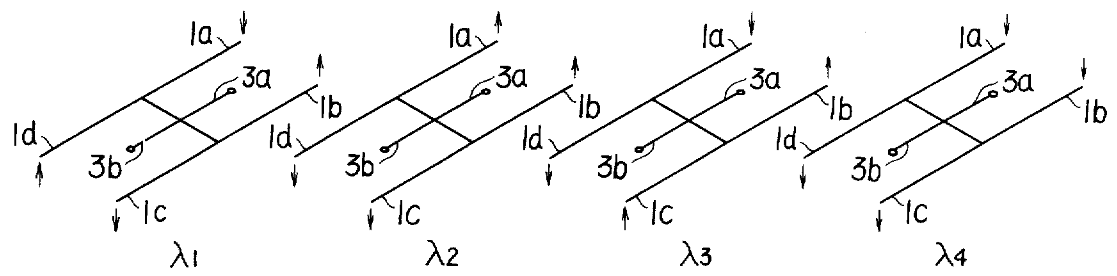
FIG. 3 is a schematic perspective view of four types of vibrating modes of the vibrator.

The particular design of the vibrator is based upon the following principle. The vibrator of H shape may take four types of vibrating modes λ1, λ2, λ3 and λ4 as shown in FIG. 3. The vibrating mode λ 1 is a normal vibrating mode and the arrows in the drawing indicates the instantaneous vibrating directions of the respective vibratory arms at a certain moment. A force or moment may hardly be applied to the supporting arms 3*a* and 3*b* while the the vibrator is vibrating in a normal vibrating mode λ1 since the vibrator is then dynamically balanced with the result that the supporting arms do not affect the frequency of the vibrator.

However, a force or moment may be applied to the supporting arms 3*a* and 3*b* while the vibrator is vibrating in the spurious vibrating modes λ2, λ3 and λ4, and the supporting arms then act as vibratory arms themselves so that the vibrating action of the supporting arms change the overall frequency of the vibrator with the result that the quality factor thereof is lowered. The vibrating action of the supporting arms with respect to the vibrator is different for each of the vibrating modes λ2, λ3 and λ4.

By experimentation, it has been found that the action of the supporting arms in the normal vibrating mode λ1 is different than that of the supporting arms in each of the other spurious vibrating modes λ2, λ3 and λ4, and also that by properly designing the length, width, etc., of the supporting arms, the vibrator may be vibrated such that the frequency in a spurious mode is sufficiently far away from that in a normal vibrating mode whereby the vibrator may be vibrated only in a normal vibrating mode at a frequency of a predetermined normal vibrating mode with the desirable result that the vibration thereof does not include the vibrating component of the spurious vibrating mode.

During vibration in the normal vibrating mode, the vibratory arms 1*a*–1*d* flexurally vibrate out of and into the plane of the vibrator while the base section 2 of the vibrator resiliently bends to accommodate the flexure of the arms. The base section 2 also undergoes a minor degree of torsion but the base section primarily bends in response to flexural vibration of the arms. By such a construction, the vibrational energy is stored mainly in the arms as flexural strain energy and partially in the base section as primarily flexural strain energy during operation of the vibrator. Since only a small amount of vibrational energy is possessed by the base section, there is a minimum of energy leakage to the supporting arms and the quality factor Q is therefore very high.

Figure 4:
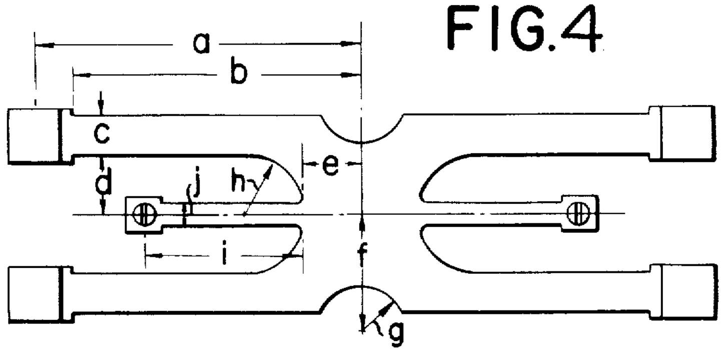
FIG. 4 is a plan view of the vibrator.

FIG. 4 shows the vibrator having the dimensions determined on the basis of the above-mentioned experiments, the details of which are as follows:

Material: Ni-span-C (0.4 mm in thickness)
Mass: 400 mg.
*a* : 22.0 mm
*b* : 19.0 mm
*c* : 2.5 mm
*d* : 3.5 mm
*e* : 3.0 mm
*f* : 7.0 mm
*g* : 2.5 mm
*h* : 3.5 mm
*i* : 7.5 mm
*j* : 0.8 mm In the vibrator of the aforementioned example, the frequency in the normal vibrating mode: $f\lambda 1$ = 150 Hz, the frequency in the spurious vibrating mode λ2: $f\lambda 2$ = 124 Hz, the frequency in the spurious vibrating mode λ3: $f\lambda 3$ = 139 Hz, the frequency in the spurious vibrating mode λ4: $f\lambda 4$ = 160 Hz.

The spurious frequencies $f\lambda 2$, $f\lambda 3$, and $f\lambda 4$ of the vibrator are far different than the frequency $f\lambda 1$ with the attendant result that the vibrator vibrated steadily in the normal vibrating mode thereby providing a high quality factor, approximately 4,000.

Another vibrator was experimented with having the dimension *i* equal to 17 mm and the other dimensions the same as in the above example.

In this vibrator, the frequency in a normal vibrating mode: $f\lambda 1$ = 150 Hz, the frequency in a spurious vibrating mode: $f\lambda 2$ = 98 Hz, the frequency in a spurious vibrating mode: $f\lambda 3$ = 121 Hz, the frequency in a spurious vibrating mode: $f\lambda 4$ = 139 Hz.

The vibrator vibrated steadily in the normal vibrating mode with the result that the quality factor thereof was very high.

Figure 5:
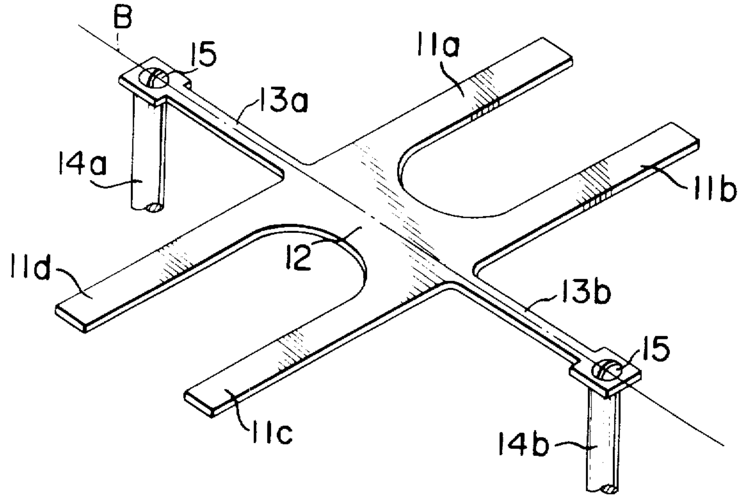
FIG. 5 is a perspective view of another embodiment of a vibrator.

FIG. 5 shows an H-shaped vibrator which has a base section 12, four resilient and flexural vibratory arms 11a through 11d extending outwardly from the base section 12 along the transverse axis of symmetry B, and a pair of supporting arms 13*a* and 13*b* extending from the base section 12. The mounting posts 14*a*, 14*b*, and the screw means 15 are substantially identical to their counterparts shown in FIG. 1.

Figure 6A:
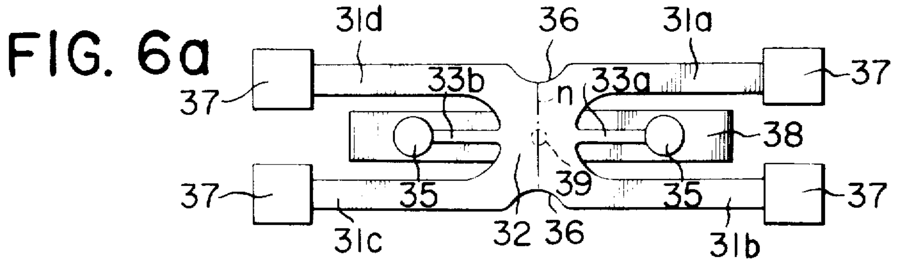
Figure 6B:
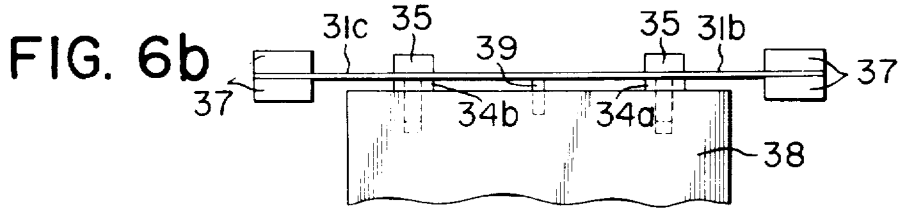

A further embodiment shown in FIGS. 6*a* and 6*b* includes additional means for suppressing the vibration of the vibrator in a spurious mode. A suppressing pin 39 of thin, cylindrical bar shape and formed of resilient material such as rubber, soft synthetic resin, etc. is vertically mounted on a base plate 38 beneath a base section 32 of the vibrator such that the upper end surface of the pin 39 is always in contact with the center of the base section 32 on a nodal line *n*.

Thus, when the vibrator is vibrating in a normal vibrating mode and receives a noise tending to bring about vibration in a spurious vibrating mode, the suppressing pine 39 suppresses the vibration of the base section thereby preventing the vibrator from changing to the spurious vibrating mode. The reference numerals 31*a*, 31*b*, 31*c*, 31*d*, 33*a*, 34*a*, 34*b*, 36 and 37 are substantially identical to their counterparts shown in FIG. 1. Rivets 35 for mounting the supporting arms to the mounting posts are press-fitted into holes provided in the mounting posts.

The aforesaid suppressing pin 39 may be press-fitted to the base section 32 at the end thereof or may be spaced a short distance from the base section at the end thereof so that it does not contact the base section when the vibrator vibrates in a normal vibrating mode but does contact the base section when the vibrator vibrates in a spurious vibrating mode. The former method is superior in suppressing ability than the latter method.

The suppressing pin may also be formed of rigid material, such as metal, hard synthetic resin, etc., and may also be in contact with the base section at the end thereof, press-fitted to the base section at the end thereof, or spaced a short distance from the base section at the end thereof.

FIG. 7 shows another embodiment of an H-shaped vibrator having two suppresing pins 49 mounted on the lower surface thereof and positioned on both sides of the base section 42 along a nodal line (not shown). Reference numerals 41*a*, 41*b*, 41*c*, 41*d*, 43*a*, 43*b*, 45 and 48 are substantially identical to their counterparts shown in FIGS. 6*a* and 6*b*.

What we claim and desire to secure by Letters Patent is:

1. A vibrator comprising: a base section having four flexural vibratory arms extending outwardly therefrom in an H-shaped configuration, said vibratory arms normally lying in a common plane with said base section and said base section having a width dimension greater than the width dimension of said vibratory arms and having a greater width dimension at its two end portions located adjacent said vibratory arms than at its midportion; means connecting said four flexural vibratory arms to said base section to undergo flexural vibration out of and into said common plane; means defining cutouts at both ends of said base section along the transverse axis of symmetry of said H-shaped configuration effectively torsionally coupling together adjacent ones of said vibratory arms; at least one pair of supporting arms extending outwardly from said base section in a direction defining an axis of symmetry of said flexural vibratory arms and cooperative together when mounted on a support to limit vibration of said vibrator to a normal vibrating mode wherein said four flexural vibratory arms undergo flexural vibration out of and into said common plane without including a vibrating component of any spurious vibrating modes; and means for mounting said at least one pair of supporting arms upon a support.

2. A vibrator according to claim 1; wherein said at least one pair of supporting arms include a pair of supporting arms extending along a transverse axis of symmetry of said H-shaped configuration.

3. A vibrator according to claim 1; wherein said at least one pair of supporting arms include a pair of supporting arms extending along a longitudinal axis of symmetry of said H-shaped configuration.

4. A vibrator according to claim 1; further comprising at least one vibration suppressing element effective to suppress vibration of a node of said vibrator upon a spurious vibrating mode to prevent said vibrator from vibrating in the spurious vibrating mode.

5. A vibrator according to claim 4; wherein said suppressing element is composed of a resilient material.

6. A vibrator according to claim 4; wherein said suppressing element is composed of a rigid material.

7. A vibrator according to claim 4; including means positioning said suppressing element to make continuous contact with a node of said vibrator.

8. A vibrator according to claim 4; wherein said suppressing element is press-fit to a node of said vibrator.

9. A vibrator according to claim 4; including means positioning said suppressing element a predetermined spaced-apart distance from a node of said vibrator to effect contact of said suppressing element with said node only during vibration of said vibrator in a spurious vibrating mode.

* * * * *